(12) United States Patent
Liermann et al.

(10) Patent No.: US 8,915,553 B2
(45) Date of Patent: Dec. 23, 2014

(54) HYDRAULIC BRAKE COMPRISING A SAFETY FUNCTION

(75) Inventors: Matthias Liermann, Aachen (DE); Toni Schiffers, Erkelenz (DE); Christian Stammen, Holzwickede (DE)

(73) Assignee: Siemens Aktiengesellschaft, Munich (DE)

( * ) Notice: Subject to any disclaimer, the term of this patent is extended or adjusted under 35 U.S.C. 154(b) by 420 days.

(21) Appl. No.: 12/440,648

(22) PCT Filed: Aug. 23, 2007

(86) PCT No.: PCT/EP2007/058773
§ 371 (c)(1),
(2), (4) Date: Mar. 10, 2009

(87) PCT Pub. No.: WO2008/031702
PCT Pub. Date: Mar. 20, 2008

(65) Prior Publication Data
US 2010/0001578 A1 Jan. 7, 2010

(30) Foreign Application Priority Data
Sep. 15, 2006 (DE) .......................... 10 2006 044 021

(51) Int. Cl.
*B60T 8/18* (2006.01)
*B60T 8/52* (2006.01)
*B60T 11/10* (2006.01)
*B60T 17/02* (2006.01)

(52) U.S. Cl.
CPC ................. *B60T 8/52* (2013.01); *B60T 11/107* (2013.01); *B60T 17/02* (2013.01)
USPC .......................................... 303/122; 303/22.1

(58) Field of Classification Search
USPC ......... 188/70 R, 70 B, 72.2, 151 R, 346, 170; 303/15, 155, 112, 20, DIG. 1, DIG. 2, 303/122, 122.04, 122.09, 22.1, 22.4
See application file for complete search history.

(56) References Cited

U.S. PATENT DOCUMENTS 3,700,075 A 10/1972 Mortimer et al.
3,716,118 A 2/1973 Gelhaar
(Continued)

FOREIGN PATENT DOCUMENTS

| CH | 613167 A5 | 9/1979 |
|---|---|---|
| DE | 1530869 A1 | 2/1969 |
| DE | 1808123 A1 | 5/1970 |
| DE | 2914626 A1 | 11/1980 |
| DE | 3422157 A1 | 2/1986 |
| DE | 3441128 A1 | 5/1986 |
| DE | 4304905 A1 | 8/1994 |
| DE | 19949817 A1 | 4/2001 |
| GB | 1019982 A | 2/1966 |
| GB | 1031116 A | 5/1966 |
| GB | 1225879 A | 3/1971 |
| GB | 2160277 A | 12/1985 |

(Continued)

OTHER PUBLICATIONS

English translation of Taiwanese Office Action dated Mar. 19, 2010.

*Primary Examiner* — Bradley King
*Assistant Examiner* — Nicholas J Lane
(74) *Attorney, Agent, or Firm* — Laurence A. Greenberg; Werner H. Stemer; Ralph E. Locher

(57) ABSTRACT

A braking device for braking a moving mass includes a movably guided coupling member for pressing a brake lining against a braking surface, a brake cylinder, filled with a hydraulic liquid, a brake piston which is movable inside the brake cylinder and which is connected to the coupling member. At least one hydraulic line can be connected to the brake cylinder. The device ensures the moving masses to be reliably decelerated. For that purpose, a fluidic-mechanical safety brake device is used to connect the brake cylinder to the one or more hydraulic lines.

14 Claims, 4 Drawing Sheets

(56) References Cited

U.S. PATENT DOCUMENTS

| | | |
|---|---|---|
| 3,727,986 A | 4/1973 | Koivunen |
| 3,872,952 A | 3/1975 | Poggie |
| 3,977,732 A | 8/1976 | Grosseau |
| 4,145,089 A * | 3/1979 | Reinecke et al. ............ 303/22.4 |
| 5,036,960 A | 8/1991 | Schenk et al. |
| 5,758,928 A | 6/1998 | Kobayashi et al. |
| 5,779,325 A * | 7/1998 | Diesel .............................. 303/72 |
| 6,594,993 B1 * | 7/2003 | Friedrichsen et al. .......... 60/442 |
| 7,000,997 B1 | 2/2006 | Wolff |
| 7,451,856 B2 * | 11/2008 | Miskin et al. ..................... 188/5 |
| 7,559,412 B2 * | 7/2009 | Murayama ................... 188/72.2 |
| 2006/0151258 A1 | 7/2006 | Miskin et al. |

FOREIGN PATENT DOCUMENTS

| | | |
|---|---|---|
| JP | 2001301594 A | 10/2001 |
| JP | 2003002183 A | 1/2003 |
| RU | 2115576 C1 | 7/1998 |
| RU | 41343 U1 | 10/2004 |
| TW | 491783 B | 6/2002 |
| WO | 2006076133 A2 | 7/2006 |

* cited by examiner

HYDRAULIC BRAKE COMPRISING A SAFETY FUNCTION

BACKGROUND OF THE INVENTION

Field of the Invention

The invention relates to a device for decelerating a moving mass, comprising a movably guided coupling element for pressing a brake lining against a braking surface, a brake cylinder which is filled with hydraulic fluid, a brake piston which can move in the brake cylinder and is connected to the coupling element, and at least one hydraulic line which can be connected to the brake cylinder.

Such a device is already known from DE 34 41 128 A1. The device disclosed in said document has a brake actuator which comprises a brake cylinder which is filled with hydraulic fluid, wherein a moving part which projects into the cylinder is provided with a brake applying means for pressing a brake lining against a brake disk is provided. The brake actuator is part of a brake caliper which is guided in a movable fashion on a pitch circle. A cylinder bore is provided as a supporting cylinder, tangentially with respect to the pitch circle, wherein a supporting piston, which is supported on a chassis of a mass to be decelerated, projects into the supporting cylinder. If the hydraulic pressure in the brake cylinder is increased, the brake linings are pressed against a brake disk which rotates in the direction of travel. Frictional locking occurs and therefore the brake caliper moves tangentially with respect to the direction of rotation of the brake disk, wherein the supporting piston which is supported on the chassis and projects into the supporting cylinder is moved deeper into the supporting cylinder. The supporting cylinder is filled with a hydraulic fluid whose pressure is increased. The supporting cylinder is connected to the brake cylinder via a hydraulic line, with the result that power boosting occurs.

GB 1,019,982 describes a device comprising a spreading element which is arranged inside a brake disk and is provided as a brake applying means for pressing a brake lining against a brake disk. In this context, the spreading element is pivotably mounted. Owing to the deceleration force occurring in the case of braking, the brake disk is pivoted as a function of the direction of rotation. In this context, the spreading element and therefore the brake lining are connected via hydraulic lines to a pressure transducer which is attached to the frame of the mass to be decelerated and has a supporting cylinder and a supporting piston which projects into the supporting cylinder. As a result of the pivoting of the spreading element, the supporting piston is pushed into the supporting cylinder, which causes pressure to be applied to the hydraulic fluid of the supporting cylinder. The supporting cylinder is connected to a further spreading element via hydraulic lines.

DE 43 04 905 A1 describes a self-energizing brake which is based on purely mechanical principles.

DE 15 30 869 describes a hydraulic brake system with a brake actuator which is connected to a brake lining via a brake applying means. Furthermore, an additional pressure transducer in the form of a cylinder bore is provided, wherein the cylinder bore is filled with a hydraulic fluid, and after the frictional locking between the brake disk and the brake lining the hydraulic fluid is compressed by a plunger. This compression amplifies the braking force in the brake actuator, with the result that brake boosting occurs.

The device of the generic type has the disadvantage that in the event of a fault it is not possible to carry out safety braking.

BRIEF SUMMARY OF THE INVENTION

The object of the invention is therefore to ensure safe braking of the moving masses in the event of a fault.

The invention achieves this object by fluid-mechanical safety braking means for connecting the brake cylinder to the hydraulic line or lines.

According to the invention, safety braking is carried out in the event of a fault. In order to be able to reliably bring the mass to a standstill even when electronic components fail, the safety braking means are not implemented as electronic components. Instead, a fluid-mechanically regulated safety braking operation with fluid-mechanical safety braking means is provided. The safety braking means are in other words fluid-mechanical regulatable safety braking means which can be used to permit safety braking even when the entire electronic system fails. The invention therefore makes available a hydraulic-mechanical brake device which is particularly failsafe. Within the scope of the invention, for example a hydraulic line is provided which has a raised hydraulic pressure compared to the atmospheric pressure or to which pressure is applied for the purpose of braking.

However, at least two hydraulic lines with different hydraulic pressures are advantageously provided. The provision of at least two or more hydraulic lines is advantageous when regulating means are used for setting the braking operation as a function of predefined set point values.

According to one expedient development, the safety braking means comprise a brake valve which can be triggered mechanically in the hydraulic lines for setting the hydraulic pressure in the brake cylinder, a mechanical set point value transmitter which is configured to apply a set point force, dependent on a set point value, to the brake valve, and a hydraulic actual value transmitter which communicates via a hydraulic regulating line with the hydraulic line or lines or the brake cylinder, and is configured to apply an actual force to the brake valve, which actual force is dependent on the pressure in the hydraulic regulating line, wherein the set point force counteracts the actual force. According to this advantageous development, a brake valve is provided which has, for example, a sliding element. The brake valve is connected on the inlet side to, for example, two hydraulic lines which have different hydraulic pressures. On the outlet side, the brake valve is connected to the brake cylinder. Depending on the position of the sliding element, a pressure or differential pressure can be generated in the brake cylinder and is used to determine the pressing force of the brake lining against the braking surface such as, for example, a rotatable brake disk. According to this advantageous development of the invention, the position of the sliding element corresponds to the difference between the set point force and the actual force. The two forces act, for example, on the sliding element from different sides. If the set point force is greater than the actual force which is derived, for example, from the hydraulic pressure in the brake cylinder, the sliding element is slid into a position with which the hydraulic pressure in the brake cylinder is increased. Increasing the hydraulic pressure causes the actual force to be increased. This brings about sliding of the sliding element in the opposite direction to the set point force, with the result that the hydraulic force in the brake cylinder is reduced. This process is repeated until the difference between the set point force and the actual force is minimized. In other words, regulated safety braking is made available by fluid-mechanical safety braking means. The safety braking means according to the invention are based on pneumatic, hydraulic or other mechanical forces which can be generated in a failsafe fashion.

The brake lining is expediently supported via connecting means with a pressure transducer which is attached to a frame of the mass to be decelerated and has a supporting cylinder which is filled with hydraulic fluid and a supporting piston which projects into the supporting cylinder, wherein the supporting cylinder communicates with the brake cylinder via the hydraulic line. According to this expedient development, a self-energizing hydraulic brake is made available which has a safety function. The self-energization is based on the fact that the brake lining is supported on a hydraulic or pneumatic pressure transducer. In the case of braking, the brake lining engages with the braking surface, and owing to the frictional locking it is accelerated tangentially with respect to the direction of rotation of the braking surface. The resulting force is applied via the connecting means to the pressure transducer whose supporting piston applies pressure to the hydraulic fluid, in which case the pressure is also increased in the brake cylinder via the hydraulic lines. However, this causes the brake lining to be pressed with greater force against the braking surface, and therefore brings about brake boosting. The surfaces of the supporting cylinder and brake actuator are advantageously selected in such a way that the pressure which is brought about in the supporting cylinder when braking occurs is higher than the pressure which is necessary for braking.

The hydraulic regulating line expediently communicates with the supporting cylinder. According to this advantageous development, the actual force for regulating the safety braking is based on the hydraulic pressure in the supporting cylinder. Said actual force therefore corresponds precisely to the deceleration force in the brake radius, that is to say the force with which the braking lining is supported on the pressure transducer. The deceleration force therefore makes available a particularly precise regulating variable since the deceleration force is causally linked to the slowing down of the moving mass.

According to one preferred exemplary embodiment, the supporting cylinder is divided into a supporting chamber and a supporting return chamber by the supporting piston, wherein the supporting chamber and the supporting return chamber communicate with a high pressure line or low pressure line via nonreturn valves. According to this advantageous development, the rotational direction of the braking surface is irrelevant for the self-energization. Self-energization of the braking is possible both for forward travel and reverse travel.

According to a development which is expedient in this regard, compression springs are provided in the supporting chamber and in the supporting return chamber, wherein a pressure transducer return valve is provided for equalizing the pressure between the supporting chamber and the supporting return chamber, and wherein a control unit initiates the pressure equalization by means of the pressure transducer return valve and the compression springs. The pressure transducer return valve can connect the two chambers of the pressure transducer to one another given corresponding activation by the control unit. Pressure equalization therefore occurs between the two chambers. The compression springs which are arranged in the chambers subsequently cause the supporting piston or the supporting cylinder to slide into the home position. This avoids braking being initiated if the supporting piston is already just before the location at which it strikes against a boundary of the supporting cylinder.

The hydraulic regulating line is expediently connected to the outlet of a valve which communicates on the inlet side with the supporting chamber or with the supporting return chamber as a function of the relatively high pressure. According to this advantageous development, the safety braking means are adapted to a two-chamber supporting system. The two-chamber supporting system permits self-energization both for forward travel and reverse travel. This is advantageous in particular in vehicles.

According to one expedient development, the set point value transmitter has an adjusting screw which interacts with an adjusting spring. The adjusting spring is, for example, a compression spring. This is compressed by rotating the adjusting screw with the result that the compressive force of the adjusting spring which acts on the brake valve is increased. Rotating the adjusting screw in the other direction reduces the spring force and therefore the set point force which is applied to the brake valve.

The set point value transmitter advantageously has a fluidic or mechanical converter which generates a set point force which is dependent on the mass to be decelerated. According to this advantageous development, the converter continuously measures, for example, the weight of the mass to be decelerated. A corresponding set point force is generated by the converter as a function of the measured weight, with the result that safety braking which is determined by the mass to be decelerated is carried out. Of course, it is also possible within the scope of the invention for both a converter and an adjusting screw to be provided, in which case the converter acts directly or via the adjusting screw.

The actual value transmitter advantageously has a pressure cylinder with a sliding element. For example, a hydraulic pressure which causes the sliding element to slide is generated in the actual value transmitter, in which case the sliding of the sliding element causes, for example, a compression spring to be compressed, with the result that a spring force, which counteracts the applied set point force, can be generated from the hydraulic pressure in the actual value transmitter. The hydraulic pressure can be generated basically in any desired way within the scope of the invention. For example, in one differing variant of the invention the sliding element is connected to the brake lining via a suitable lever mechanism. In other words, the brake lining is supported on the pressure cylinder via fluidic or mechanical means.

An electric regulating device is expediently provided, wherein the safety braking means is configured to initiate a regulated braking operation if the electric regulating device fails. The electric regulating device is configured to regulate the deceleration of the mass in the normal operating mode. In this context, the electric regulating device allows for the safety braking means, specifically for example to the extent that the electric regulating device calculates a predetermined set point force taking into account the mechanical set point force which has already been predefined by the safety braking means, with the result that the set point force which is predefined by means of the electric regulating device corresponds, for example, to the difference between a desired set point force and the mechanical set point force. However, if the electric regulating device fails, the safety braking means intervene and carry out a safety braking operation as a function of the mechanical set point force.

According to one expedient development, an electric regulating device acts on the brake valve by means of an actuating element. The brake valve is therefore accessed by means of an actuating element, for example a component which acts on a sliding element of the brake valve. The actuating element is, for example, a component which operates electrodynamically and which applies a force to the sliding element of the brake valve as a function of a current. In contrast to this, the actuating element is configured to rotate an adjusting screw.

According to one expedient development, the coupling element is connected to the brake lining via a lever mechanism. The coupling element is, for example, a push rod which acts on the brake lining via levers and linkages and which is arranged spatially remote from the brake cylinder. However, such lever mechanisms are known to a person skilled in the art so that more details will not be given on them at this point.

According to one advantageous development, the brake actuator comprises a brake cylinder which is filled with hydraulic fluid and a brake piston which can move relative to one another. However, in contrast to this customary configuration of the brake actuator, other brake actuators which are known as such to a person skilled in the art can also be used within the scope of the invention.

The brake piston is expediently permanently connected to the coupling element.

According to one preferred embodiment of the invention, the brake cylinder is divided into a braking chamber and a braking return chamber by means of the brake piston. The brake cylinder is, in other words, configured as a double-acting cylinder. The braking force which is set is therefore substantially dependent on the pressure difference between the braking chamber and the braking return chamber.

According to a further advantageous refinement of the invention, the coupling element comprises a brake rod which extends through the braking return chamber. According to this advantageous development of the invention, when there is a pressure equilibrium between the braking chamber and braking return chamber a relatively large force is generated in the braking chamber owing to the relatively large surface of the brake piston in the braking chamber, with the result that when there is a pressure equilibrium the brake piston is slid out of its center position. This is advantageous, for example, in order to initiate safety braking when there is a loss of pressure. There may also be the effect of a pre-stressing spring.

The brake actuator advantageously comprises a brake cylinder and a brake piston which divides the brake cylinder into a braking chamber and into a braking return chamber, wherein the braking chamber and the braking return chamber can be connected, by means of a brake valve, both to a fluidic high pressure circuit and to a fluidic low pressure circuit.

According to a further advantageous development of the invention, a pre-stressing spring for pressing the brake lining against the braking surface is provided. Within the scope of the invention the pre-stressing spring is basically arranged in any desired way. If pressure is not present in the hydraulic lines, the brake lining continues to be pressed against the braking surface by the force of the pre-stressing spring.

A high pressure vessel, which is part of a high pressure circuit, and a low pressure vessel, which is part of a low pressure circuit, are advantageously provided for making available hydraulic fluid, wherein the high pressure circuit and the low pressure circuit are connected to the brake valve. The brake valve is expediently provided for generating any desired pressures in the brake actuator, wherein the pressures which can be generated are in the range of the pressure difference between the high pressure circuit and the low pressure circuit.

According to one development which is expedient in this regard, each high pressure vessel and each low pressure vessel is respectively equipped with a nonreturn valve and a restrictor. If the pressure in the high pressure vessel or the pressure in the low pressure vessel exceeds the pressure in the high pressure circuit or in the low pressure circuit respectively, further hydraulic fluid is fed from the respective pressure vessel into the hydraulic circuit via the restrictor, with the result that there is always a sufficient quantity of hydraulic fluid available.

The brake lining is expediently connected to the supporting cylinder via the connecting means, the supporting piston being attached to the frame. This variant of the invention permits particularly compact manufacture of the device according to the invention since all the cylinders and lines which are filled with hydraulic fluid can, for example, be combined to form one component. In particular, common manufacture of these components is made possible. The supporting piston, or the supporting rod which extends out of the supporting cylinder from the supporting piston, merely has to be attached by its free end, facing away from the supporting piston, to the frame of the mass to be decelerated.

According to an embodiment of the invention which differs from this, the brake lining is connected to the supporting piston via the connecting means, wherein the supporting cylinder is attached to the frame.

Further expedient embodiments and advantages of the invention are the subject-matter of the following description of exemplary embodiments of the invention with reference to the figures in the drawing, in which identical reference symbols refer to identically acting components, and of which figures

DESCRIPTION OF THE INVENTION

Figures 1A, 1B:
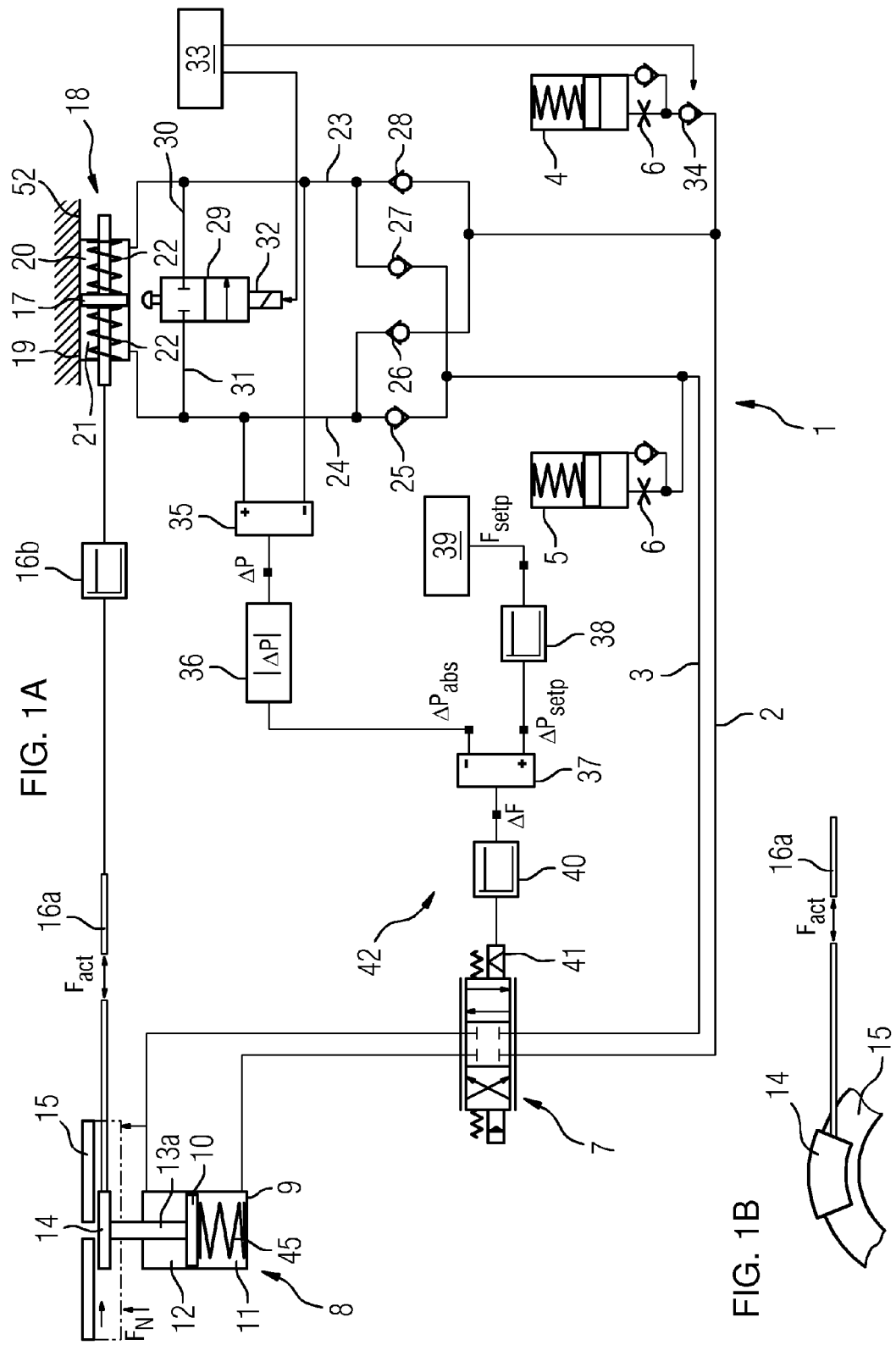
FIGS. 1A-1C show an exemplary embodiment of the device according to the invention, the safety braking means of which device are not illustrated figuratively.
Figure 1C:
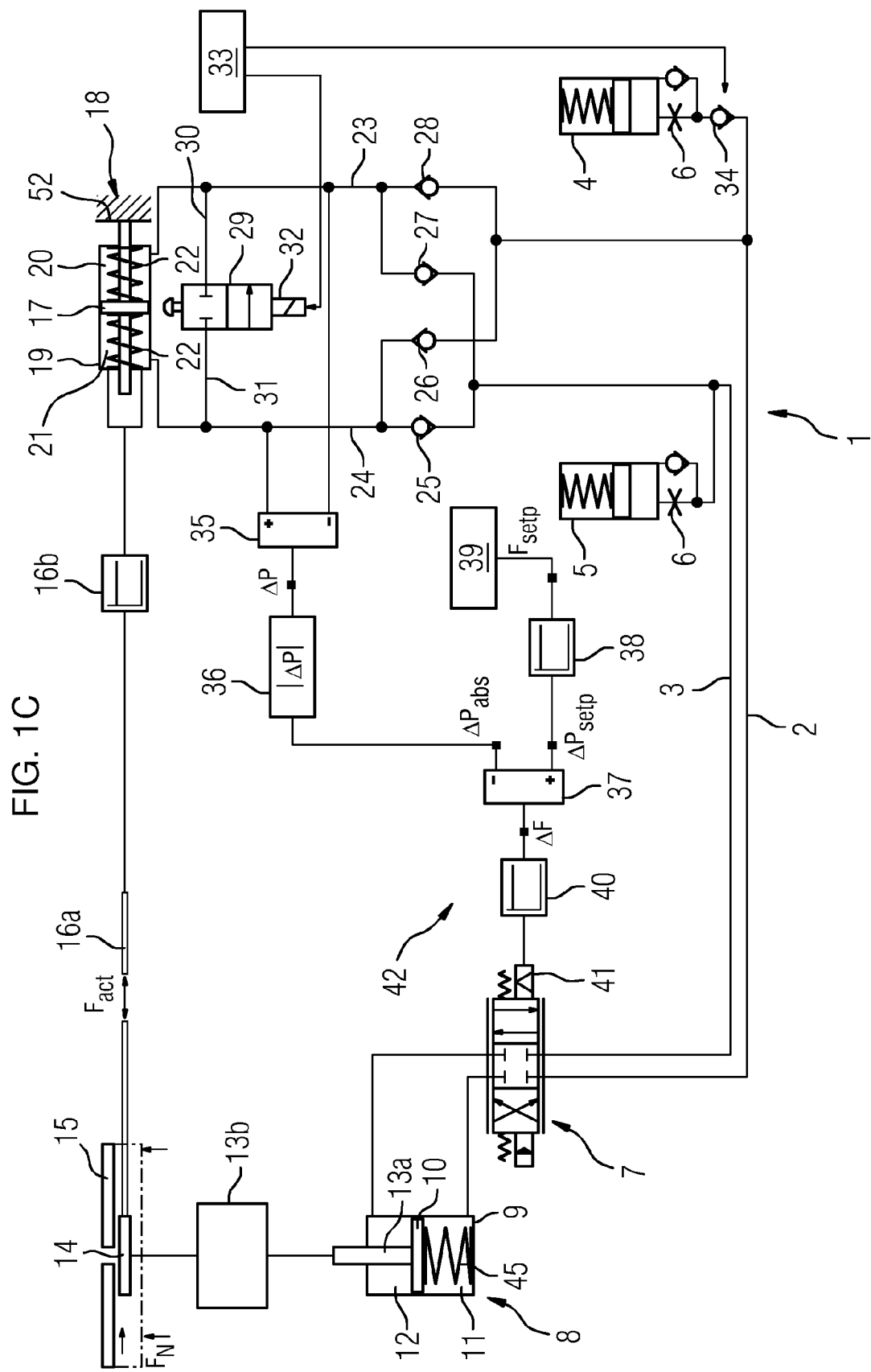

FIGS. 1A-1C show a first exemplary embodiment of the device 1 according to the invention in a schematic illustration, with the safety braking means not being illustrated figuratively. The device 1 according to the invention comprises a high pressure circuit 2 and a low pressure circuit 3, which each communicate with a high pressure vessel 4 or with a low pressure vessel 5. The high pressure vessel 4 and the low pressure vessel 5 are each equipped with a combination of a restrictor and nonreturn valve 6, via which nonreturn valve 6 the latter is connected to the respective hydraulic line 2, 3. If the pressure in the respectively assigned hydraulic line 2, 3 is lower than in the high pressure vessel 4 or the low pressure vessel 5, hydraulic fluid exits the respective pressure vessel 4, 5 and is made available to the system. A lack of hydraulic fluid is counteracted in this way. The high pressure circuit 2 and the low pressure circuit 3 are connected via an analog slider control valve 7 as a brake valve to a brake actuator 8 which has a brake cylinder 9. The brake cylinder 9 is divided by a brake piston 10 into a braking chamber 11 and a braking return chamber 12. A coupling rod 13a extends as a coupling element from the pressure piston 10 to a brake lining 14, which is provided for pressing against a brake disk 15 as a braking surface. The coupling element 13a is connected to the brake lining 14 via a lever mechanism 13b. FIGS. 1A-1C show the brake disk 15 and the brake lining 14 both in a plan view and in a side view.

In the illustration shown in FIGS. 1A-1C, it is possible to see that the brake lining 14 is connected via supporting means 16a, such as for example a simple rod or any desired other lever mechanism, to the supporting piston 17 of a pressure transducer 18. The pressure transducer 18 has a supporting cylinder 19, in addition to the supporting piston 17. The supporting piston 17 divides the supporting cylinder 19 into a supporting chamber 20 and into a supporting return chamber 21. Compression springs 22 are respectively arranged in the supporting chamber 20 and in the supporting return chamber 21. The supporting cylinder 19 is attached to a frame 52.

The brake lining 14 is mounted so as to be movable tangentially with respect to the direction of rotation of the rotary disk 15, and is therefore supported on the pressure transducer which is attached to a bogie of a rail vehicle.

The supporting chamber 20 and the supporting return chamber 21 are each connected via expedient hydraulic lines 23 or 24 to the high pressure circuit 2 or the low pressure circuit 3. In this context, the hydraulic lines 23, 24 communicate with nonreturn valves 25 to 28. The nonreturn valves 25, 26 which are arranged in the hydraulic line 24 of the supporting return chamber 21 are oriented in opposite directions to one another. If the pressure in the supporting return chamber 21 is higher than in the low pressure circuit 3, the nonreturn valve 25 closes the connection between the hydraulic line 24 and the low pressure circuit 3. If, on the other hand, the pressure in the supporting return chamber 21 is higher than that in the high pressure circuit 2, the nonreturn valve 26 opens with the result that fluid, for example a suitable hydraulic fluid, is forced out of the supporting return chamber 21 and is fed into the high pressure vessel 4. If, in contrast, the pressure in the supporting return chamber 21 is lower than in the low pressure circuit 3, the valve 25 opens, permitting hydraulic fluid to flow out of the low pressure vessel 5 into the supporting return chamber 21. The same applies to the interaction of the supporting chamber 20 and the nonreturn valves 27, 28 via the hydraulic line 23.

FIGS. 1A and 1C also show a pressure transducer return valve 29 which communicates with the supporting chamber 20 or the supporting return chamber 21 via hydraulic lines 30 and 31. The pressure transducer return valve 29 has a sliding element 32 which, when activated, brings about the pressure equalization between the supporting chamber 20 and the supporting return chamber 21. If a pressure equalization occurs, the pressure springs 22 slide the supporting piston 17 back into the central position shown in FIGS. 1A and 1C. This avoids the supporting piston 17 being slid against a boundary wall of the supporting cylinder 19, therefore interrupting the brake boosting. An expedient pressure equalization control unit 33 serves to activate the pressure transducer return valve 29. The activation is in turn carried out, for example, by means of electrodynamic forces.

The pressure equalization control unit 33 also acts on a regulating valve 34 which can be released and which permits the pressure from the high pressure circuit 2 to be let out, for example for maintenance purposes.

The hydraulic lines 23 and 24 are each provided with calibrated pressure/voltage converters (not illustrated figuratively). Each pressure/voltage converter makes available, at its output, a voltage which is proportional to the pressure in the supporting chamber 20 and/or in the supporting return chamber 21.

The output of each pressure/voltage converter is connected to the input of a difference generator 35. The difference generator 35 is connected at the output end to an absolute value generator 36 which calculates the absolute value $|\Delta p|$ from the pressure difference $\Delta p$ made available by the difference generator 35. The absolute value of the pressure difference $|\Delta p|$ is finally applied to the input of a comparator 37. A set point pressure difference $\Delta p_{setp}$ is applied as set point value to the second input of the comparator 37, said set point pressure difference $\Delta p_{setp}$ being calculated on the basis of a set point force $F_{setp}$ and as a function of a predefined area factor 38. The set point force $F_{setp}$ is input by a user of the device by means of an expedient control unit 39. The comparator 37 generates, at its output, a difference value $\Delta F$ which is applied to the input of a control unit 40, which subsequently slides a sliding element 41 of the brake valve 7 in such a way that the difference value $\Delta F$ is minimized. The brake valve 7 is, for example, a proportional valve.

A pre-stressing spring 45 is used to press the brake lining 14 against the brake disk 15. The pre-stressing spring 45 presses the brake lining against the brake disk if a pressing-on force cannot be generated hydraulically.

The method of operation of the device 1 according to the invention is as follows: in order to apply a braking process a set point force $F_{setp}$ is requested using the regulating means 42. The regulating means 42 comprise the control unit 39, the measuring sensors (not illustrated figuratively), the difference generator 35, the absolute value generator 36, the area factor generator 38, the comparator 37, the regulating unit 40 and the brake valve 7. The pressure difference $\Delta p$ between the supporting chamber 20 and the supporting return chamber 21 is equal to zero at the start of the braking operation, with the result that a large difference value $\Delta F$ is generated by the comparator 37. The regulating unit 40 subsequently slides the sliding element 41 to the left, with the result that a large pressure difference is generated between the braking chamber 11 and the braking return chamber 12. In this context, the pressure in the braking chamber 11 is higher than in the braking return chamber 12. The brake piston 10 is slid and as a result a pressing-on force $F_N$ is applied to the brake disk 5 in the direction indicated by the arrows. The frictional locking between the brake lining and the brake disk 5 causes a frictional force to be generated which is directed tangentially with respect to the direction of rotation of the brake disk 5 or, in other words, a deceleration force $F_{act}$ is generated. The deceleration force $F_{act}$ is applied to the supporting piston 17 via the connecting means 16b, that is to say the lever mechanism, owing to the movable mounting of the brake lining 14. When the brake disk 15 rotates, the supporting piston 17 is slid to the right in the clockwise direction out of the position shown in FIGS. 1A and 1C. The pressure of the hydraulic fluid is therefore increased in the supporting chamber 20 compared to the pressure of the hydraulic fluid in the supporting return chamber 21. The pressures are respectively sensed by the pressure/voltage converter and are applied to the input of the difference generator 35. This gives rise to a pressure difference $\Delta p$ at the output of the difference generator 35, and therefore to a corresponding absolute value $|\Delta p|$ at the output of the absolute value generator 36. The difference value $\Delta F$ becomes smaller, and in the further course of the regulating process the regulating unit 40 ensures here that the difference value $\Delta F$ is ultimately minimized. In other words, the invention brings about self-energization and simultaneous regulation of the braking force.

Figures 2A, 2B:
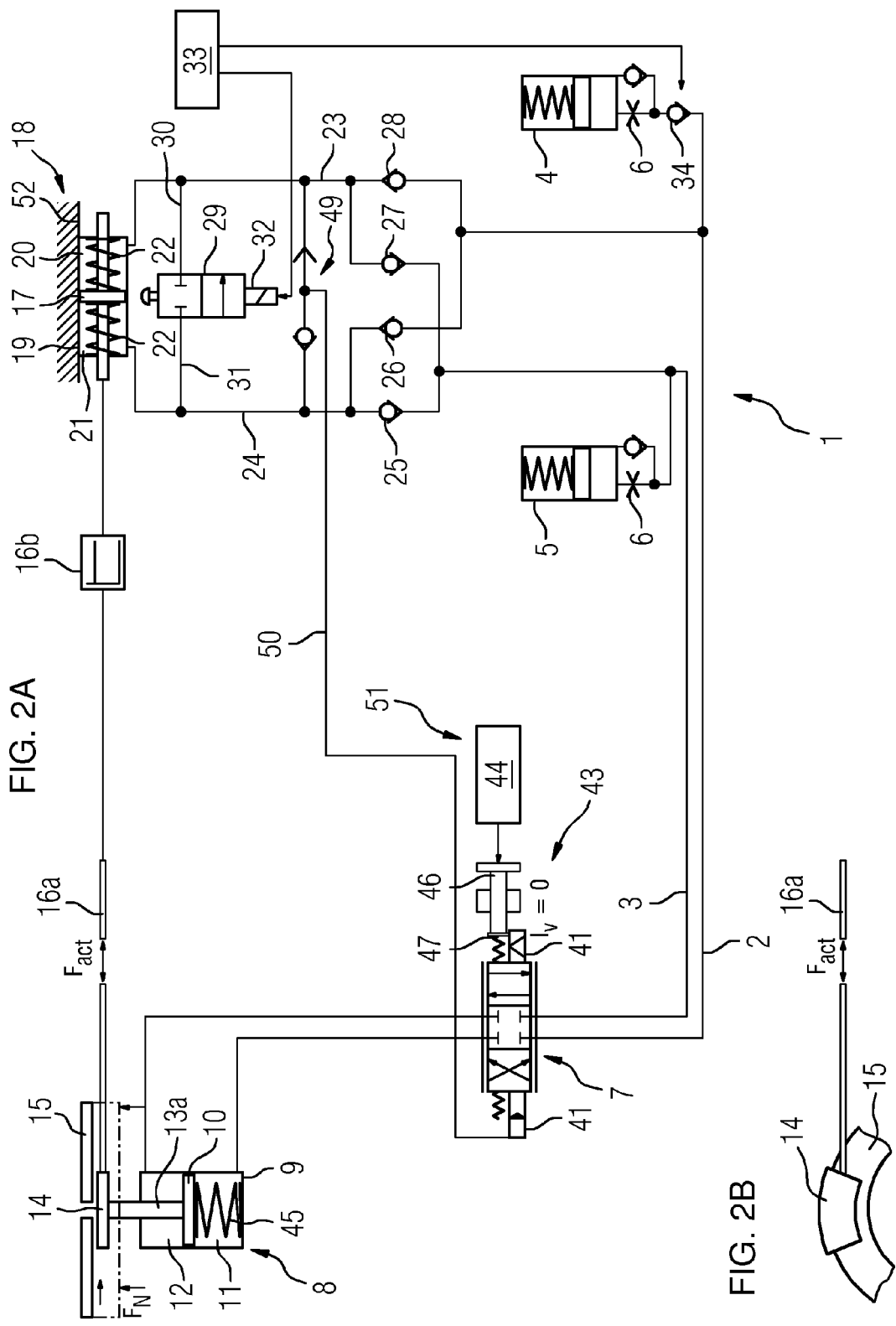
FIGS. 2A-2C show the device according to FIGS. 1A-1C when the electronic regulating unit fails.
Figure 2C:
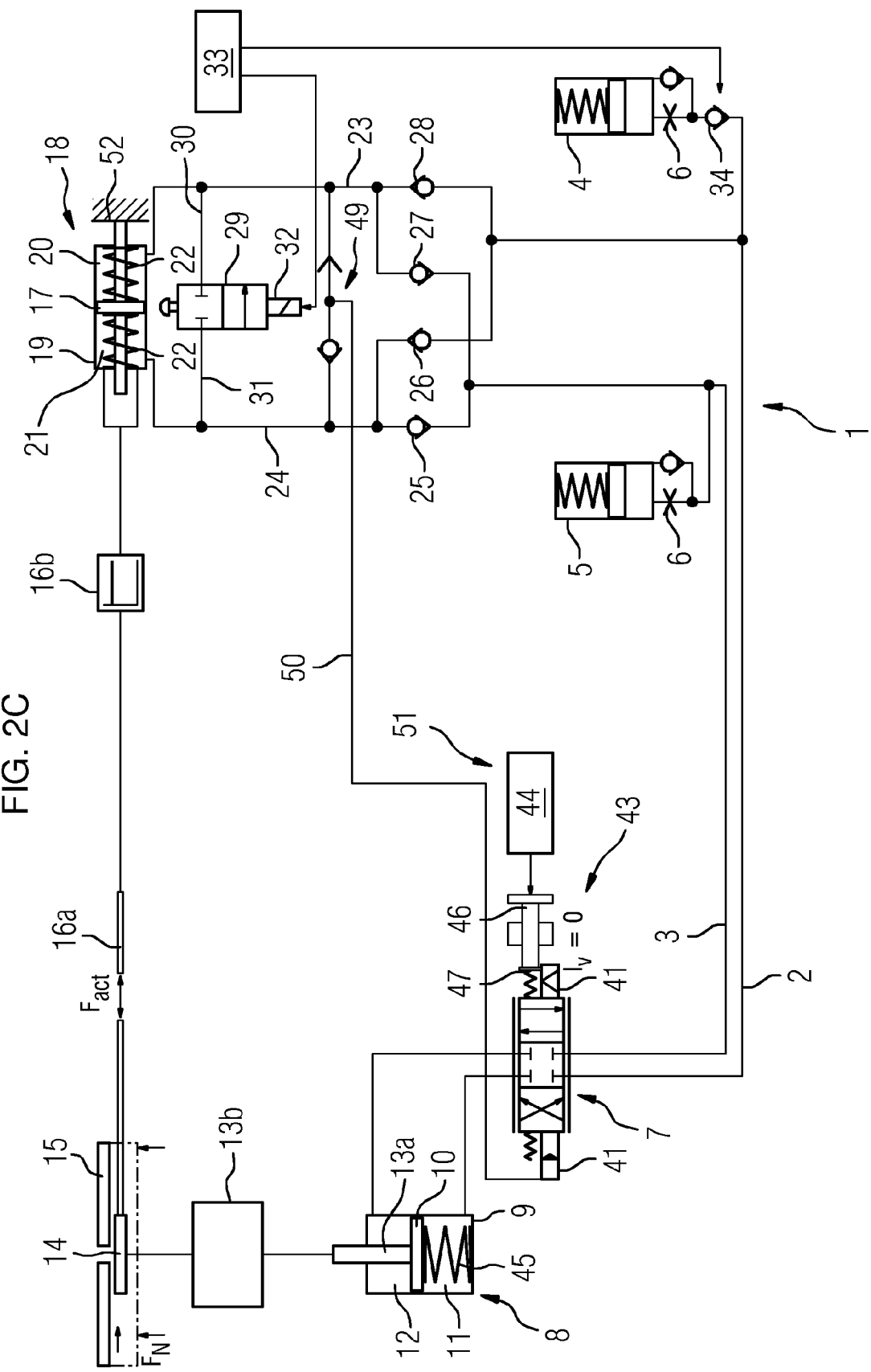

FIGS. 2A-2C show the exemplary embodiment according to FIGS. 1A-1C, but here the electronic components of the electric control device 42 have been omitted for reasons of clarity. It is apparent that the regulation of the brake valve 7 is now carried out by the fluid-mechanical safety means 43. The latter comprise a load correction means 44, which is indicated schematically. The load correction means 44 comprises a load signal transmitter which, as a function of the weight of the mass to be decelerated, adjusts an adjusting screw 46 in such a way that the spring force of a compression spring 47 applies the necessary set point force to the sliding element 41 of the brake valve 7. In contrast to this, the load correction means can also act directly on the sliding element. The set point force is counteracted by an actual force, with the actual force being generated by an actual force signal transmitter (not illustrated figuratively). The actual force signal transmitter comprises a pressure cylinder (not illustrated) which comprises a sliding element 41 and applies an actual force to the sliding element 41. The actual force is opposed to the set point force. The pneumatic pressure in the pressure cylinder of the actual value signal transmitter corresponds either to the pressure of the supporting chamber 20 or of the supporting return chamber 21, depending on which of said chambers has the higher hydraulic pressure. A double nonreturn valve 49, whose two inlets are connected to the supporting chamber 20 or to the supporting return chamber 21, is used for this. A hydraulic regulating line 50 connects the outlet of the double nonreturn valve 49 to the pressure cylinder of the actual value signal transmitter.

The safety braking means 43 comprise the load correction means 44, the adjusting screw 46, the compression spring 47, the brake valve 7 with sliding element 41 and the actual value signal transmitter (not illustrated figuratively).

If the electronic components of the electric regulating unit 42 fail, the safety braking means 43 therefore initiate a regulated safety braking operation. The braking force is predefined by the set point force here. At the start of the braking operation, the pressure in the supporting chamber 20 or in the supporting return chamber 21 is equalized and is so low that the actual force which is generated by means of the actual value signal transmitter is lower than the set point force which is set by the set point value transmitter, that is to say by the adjusting screw 46 with the compression spring 47. Accordingly, the sliding element 41 is moved to the left in the illustration according to FIGS. 2A and 2C. This means that a large pressure difference is generated in the brake cylinder 9, and the brake lining 14 is pressed with a high normal force $F_N$ against the brake disk 15. The brake disk 15 moves in the clockwise direction, with the result that pressure is built up in the supporting return chamber 21. The increased pressure in the supporting return chamber 21 causes the pressure in the pressure cylinder (not illustrated figuratively) of the actual value signal transmitter also to be increased. This brings about an increase in the actual force which causes the sliding element 41 in FIGS. 2A and 2C to be slid to the right, with the result that the pressure difference in the chambers of the brake cylinder 9 is reduced. The normal force $F_N$ is attenuated. This is continued until the supporting force of the brake lining 14 at the pressure transducer 18 corresponds to the set point force which has been set.

The invention claimed is:

1. A device for braking or decelerating a moving mass, comprising:
   a movably guided coupling element for pressing a brake lining against a braking surface;
   a brake cylinder filled with hydraulic fluid;
   a brake piston movably disposed in said brake cylinder and connected to said coupling element;
   at least one hydraulic line fluidically connectible with said brake cylinder;
   fluid-mechanical safety braking means for connecting said brake cylinder to said at least one hydraulic line, said fluid-mechanical safety braking means including:
      a mechanically controlled brake valve in said at least one hydraulic line for setting a hydraulic pressure in the brake cylinder,
      load correction means configured to apply a set point force, which is dependent on the mass to be decelerated, to said brake valve,
      a sliding element configured to communicate through an hydraulic regulating line with said at least one hydraulic line or with said brake cylinder said brake valve being an analog slider control valve including said sliding element, said sliding element configured to be acted on by said set point force;
   a pressure transducer to be attached oaf a e of the mass to be decelerated, said pressure transducer having a supporting cylinder filled with hydraulic fluid and communicating with said brake cylinder via said at least one hydraulic line, said pressure transducer having a supporting piston dividing said supporting cylinder into a supporting chamber and a supporting return chamber; and
   regulating means acting on said brake valve to minimize a difference value between a predefined set point value and an absolute value of a difference in pressure between a hydraulic pressure in said supporting chamber and a hydraulic pressure in said supporting return chamber;
   wherein said load correction means is configured to cause an actual force to be applied to said sliding element of said analog slider control valve, the actual force is dependent on the pressure in the hydraulic regulating line, and the set point force counteracts the actual force; and
   wherein said fluid-mechanical safety braking means is configured to initiate a regulated braking operation upon a determination that said regulating means has failed.

2. The device according to claim 1, wherein said at least one hydraulic line is one of two hydraulic lines with mutually different hydraulic pressures.

3. The device according to claim 1, wherein the brake lining is supported via connecting means.

4. The device according to claim 3, wherein said hydraulic regulating line is connected to communicate with said supporting cylinder.

5. The device according to claim 3, wherein said supporting chamber and said supporting return chamber are connected to communicate with a high pressure line or low pressure line via check valves.

6. The device according to claim 5, which further comprises compression springs disposed in said supporting chamber and in said supporting return chamber, a pressure transducer return valve for equalizing a pressure between said supporting chamber and said supporting return chamber, and a control unit configured to initiate the pressure equalization by way of said pressure transducer return valve and said compression springs.

7. The device according to claim 5, which comprises a valve having an inlet communicating with said supporting chamber or with said supporting return chamber as a function of a high pressure, and an outlet connected to said hydraulic regulating line.

8. The device according to claim 1, wherein said load correction means has an adjusting screw interacting with an adjusting spring.

9. The device according to claim 1, which comprises a lever mechanism connecting said coupling element to the brake lining.

10. The device according to claim 1, which comprises a brake piston disposed to divide said brake cylinder into a braking chamber and a braking return chamber.

11. The device according to claim 1, which comprises a pre-stressing spring disposed to press the brake lining against the braking surface.

12. The device according to claim 1, which comprises a high pressure vessel and a low pressure vessel for making available hydraulic fluid.

13. The device according to claim 3, wherein the brake lining is connected to said supporting cylinder via the connecting means, and said supporting piston is attached to a frame of the device.

14. The device according to claim 3, wherein the brake lining is connected to said supporting piston via the connecting means, and said supporting cylinder is attached to a frame of the device.

\* \* \* \* \*